March 29, 1955 E. W. GENDRON 2,705,264

AUXILIARY TELEPHONE BRACKET

Filed Dec. 10, 1952

INVENTOR.
Everett W. Gendron
BY Kenneth V. Snow
Atty.

United States Patent Office 2,705,264

Patented Mar. 29, 1955

2,705,264

AUXILIARY TELEPHONE BRACKET

Everett W. Gendron, Chicago, Ill.

Application December 10, 1952, Serial No. 325,067

2 Claims. (Cl. 179—146)

This invention relates to a new and improved auxiliary telephone bracket.

Present day telephones have a single speaking and hearing piece which when not in use is carried in a generally horizontally disposed cradle formed on a base member. The single speaking and hearing piece is shaped so that it curves around the portion of a person's head between an ear and the mouth. It thus becomes a problem of where to put this piece of the telephone when a "call" is in process and at a time when you cannot continually hold it. The fact that the instrument is curved and has enlarged ends for conforming to the ear and the mouth of the user prevents it from being just set down in a small area. Usually a telephone stand is not large enough to hold this single mouth and ear piece separately from the phone base and as a result the piece is dropped to the floor after attempting to place it down next to the base. This invariably causes breakage of the very costly instruments. In other installations the handset as it is commonly called is put or thrown onto a desk or table where it mars the furniture and also contributes to chipping of the plastic telephone instruments.

It is therefore a principal object of this invention to provide an auxiliary telephone bracket to support single ear and mouth pieces apart from the regular base cradle.

An important object of this invention lies in the provision of a simple bracket means which may be removably inserted into a recess in a telephone base for accommodating a telephone handset separate from the circuit disengaging cradle.

Another important object of this invention is to supply a quickly and easily attached cradle bracket for snap insertion into telephone bases and for the purpose of carrying a single mouth and ear piece of the telephone during those periods of time when a call is in process and you want to maintain connection on the call and yet must put the single piece down.

Still another important object of this invention is to provide an auxiliary cradle for telephones which may be put into and held by the telephone base and shaped and constructed to lock within the base.

Another and still further important object of this invention is the provision of a simple gravity type of lock to insure the auxiliary cradle stability in the telephone base.

Still another object of the invention is to supply an auxiliary cradle with a snap spring lock for holding the cradle to the telephone base.

Another object of the invention is to provide means to quickly and easily remove the auxiliary handset brackets from the telephone base.

Another and further important object of this invention is the provision of passage means in the auxiliary brackets for venting the telephone mechanism through the usual vents in the telephone base.

Other and further important objects and advantages will become apparent from the disclosures in the following specification and accompanying drawings.

Figure 1:
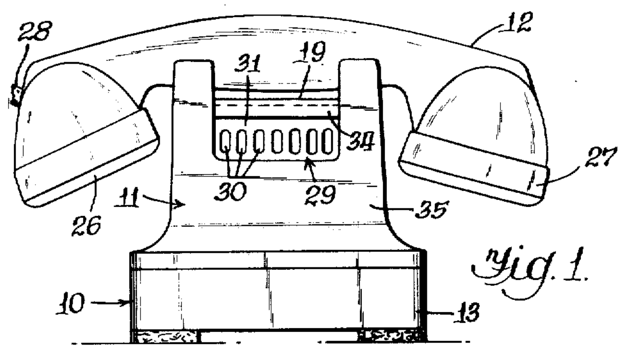
Figure 1 is a rear elevational view of a cradle type telephone to which an auxiliary handset bracket of this invention may be attached.

The reference numeral 10 indicates generally a present day cradle type telephone having a base 11 and a single ear and mouth piece 12 which for convenience will be called a handset. The telephone base 11 has a desk or table engaging bottom 13 and an upwardly extending cradle 14 to carry the receiver 12. A forwardly and downwardly inclined front wall 15 of the base is arranged to carry dialing equipment 16, or if such dial service is not available then this wall would merely carry the telephone number. However, as shown there is a dial provided and the telephone number is indicated at 17 in the center thereof. A stationary dial index member is shown at 18.

The cradle 14 includes a transverse bed portion 19 and upwardly projecting corner posts 20, 21, 22, and 23 which are adapted to confine the receiver on and within the bed 19. Laterally spaced apart vertically movable electric contacts 24 and 25 are disposed on opposite ends of the bed 19. When the handset 12 is in position on the cradle 14 the contacts 24 and 25 are depressed to complete that electrical circuit which permits a bell in the base to be actuated by a party calling the particular number of that telephone. When the handset is removed from the cradle 14 the electrical contacts 24 and 25 move upwardly by a spring urging and cause the completion of an audio circuit with the party calling. Or, when a call is to be made the handset is again lifted from the cradle 14 to complete the electrical circuit to the central telephone station so that dial or orally requested calls may be effected.

The handset 12 has an enlarged mouth or speaking end 26 and an enlarged ear or listening end 27. An electrical cord 28 (broken off) is shown coming from the handset 12 so that it may be electrically joined to the base unit 11.

Figures 3, 5:
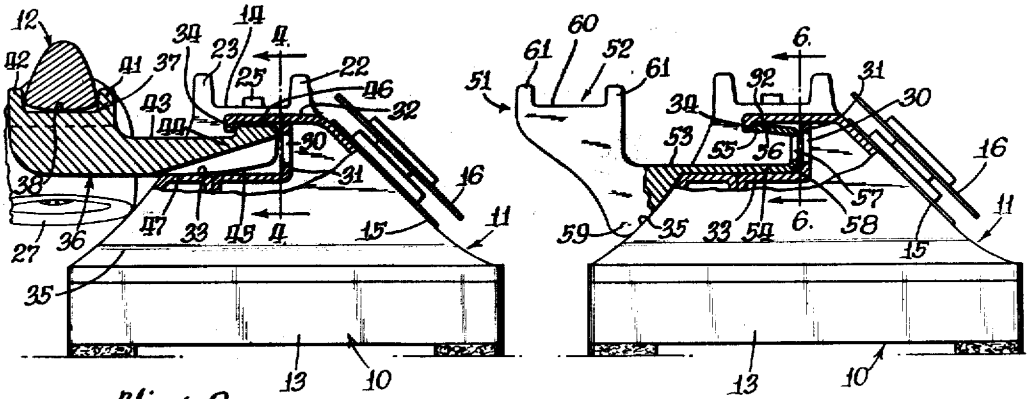
Figure 3 is a sectional view taken on the line 3—3 of Figure 2 with portions of the telephone base shown in elevation.
Figure 5 is a partial sectional view corresponding to Figure 3 and showing a modified form of auxiliary cradle bracket.

As best shown in Figures 1, 3, and 5 there is a recess 29 provided beneath the bed 19 of the cradle 14 and opening only to the back of the telephone. The recess 29 is employed for several reasons one of which is just an economical construction to effect a saving of material. Another reason for the recess is to permit the free passage of sound. This facilitates the hearing of a bell located within the base housing. A further reason for the recess is to provide ventilation or cooling of the electrical telephone equipment located within the base 11. The cooling is accomplished by a series of spaced apertures 30 disposed in a vertical wall 31 formed in the inner end of the recess 29. It should be understood that all telephones do not have these venting apertures, but for those telephones that do, the auxiliary bracket of this invention does not hinder or interfere in any manner with the effective cooling of the interior of the telephone apparatus. The recess 29, in addition to having the inner vertical wall 31, has vertically spaced apart top and bottom walls 32 and 33. The top wall 32 has a downwardly projecting lip 34 along its rearward edge. The bottom wall is substantially flat and horizontally level. The recess 29 has its rearward opening in an inclined back wall 35 of the telephone base 11.

Figure 4:
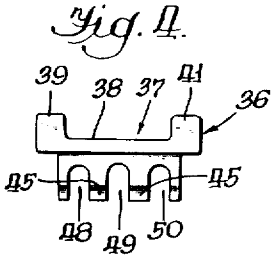
Figure 4 is an end view of the bracket taken from the line 4—4 of Figure 3.
Figures 2, 6:
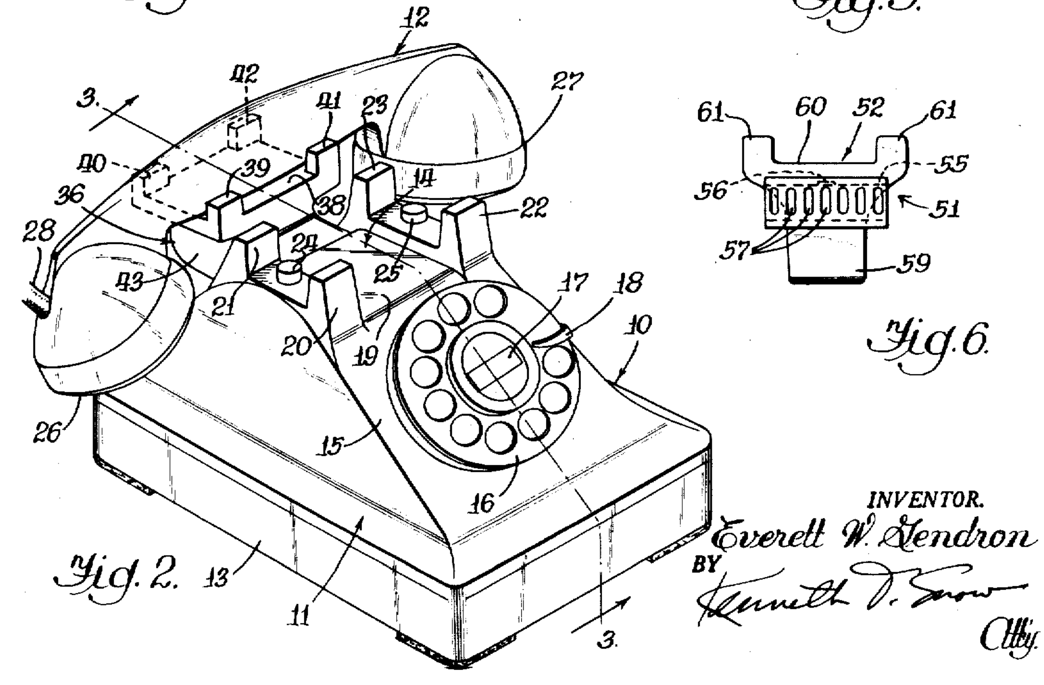
Figure 2 is a perspective view of a telephone showing an auxiliary cradle thereon and with the telephone single mouth and ear piece resting in the auxiliary cradle.
Figure 6 is an end view of the modified form of bracket taken from the line 6—6 of Figure 5.

As best shown in Figures 2, 3, and 4 there is provided one form of an auxiliary cradle to support the telephone handset when a call is in process. This might occur in many instances as when you are calling someone else to the telephone, or when you leave the telephone to look for something. This auxiliary cradle thus provides the useful function of carrying the handset closely adjacent the telephone base and by so doing insures the safety of the handset against damage and also prevents damage to furniture around the telephone on which the handset might be dropped if there were no place to support it. The auxiliary bracket 36 preferably made of plastic or metal has a cradle 37 which substantially duplicates the cradle 14 of the telephone base 11. This supplementary cradle 37 has a transversely disposed bed 38 and upstanding corner posts 39, 40, 41, and 42 which clearly define the place where the handset may safely rest while maintaining a call. The auxiliary cradle 37 is joined by a forwardly extending member 43 which constitutes the finger gripping space between the regular cradle 14 on the telephone base 11. A portion 44 is formed on the forward end of the auxiliary cradle adjacent the intermediate member 43. The portion 44 is adapted to be put into the recess 29. Figures 3 and 4 best show the portion 44 which has a relatively slightly inclined lower surface 45 and an upwardly extending lip or ridge 46 on the top side. When it is desired to apply this auxiliary bracket to a telephone base it should be tilted downwardly and forwardly so the inclined surface 45 of the portion 44 slides on the horizontal bottom 33 of the recess 29. The tilting of the bracket permits the raised lip 46 to move inwardly of the recess beneath the downwardly projecting flange lip 34 of the top recess wall 32. When the portion 44 is within the recess 29 the bracket is permitted to drop by gravity to a horizontal position thus causing it to be locked within the recess. The raised lip 46 is hooked behind the depending lip 34 of the base 11 preventing direct withdrawal of the bracket from the base recess. The underside of the bracket 36 at the position of the intermediate section 43 fulcrums as shown at 47 on the lower bottom wall 33 of the recess 29 thus urging the lips into interconnection.

Laterally spaced grooves 48, 49, and 50 are provided within the recess engaging portion 44 of the bracket 36 to substantially define laterally spaced apart arms therebetween. The grooves are inclined rearwardly from a high opening at the end of the bracket 36 adjacent the apertured wall 31 and diminishing to a point located outside the base 11. This insures that proper venting of the telephone may continue uninterruptedly even with the auxiliary bracket locked within the base recess 29.

Obviously the bracket 36 may be removed simply by tilting it upwardly at its rear and then pulling it out. However, in all normal use of the bracket it will remain a part of the telephone ready for service at any time.

Figures 5 and 6 show a modified form of auxiliary bracket designated by numeral 51. This bracket has a cradle portion 52, an intermediate portion 53, and a socket or recess engaging portion 54. Here again the bracket may be made of any suitable material, but is preferably plastic or metal. The difference between this auxiliary bracket and the bracket 36 of Figures 2, 3, and 4 lies in the method of locking the bracket within the recess. The end portion 54 is not a solid projection such as the projection 44 of the bracket 36, but rather the portion 54 is a reverse C shape of spring material. The reverse C shape substantially coincides with the internal shape of the recess 29. A rearwardly extending spring lip 55 of the part 54 is adapted to slide beneath the downwardly extending lip 34 of the recess top wall 32 while under compression and then when the portion 54 is completely within the recess 29 the lip 55 snaps back up thus locking the bracket to the telephone base 11. In this modified form of bracket it is necessary to provide a tool engaging notch 56 in the center of the spring lip 55 so that by means of a screwdriver or the like the lip may be sprung downwardly and the bracket withdrawn from the recess. In conformance with the other auxiliary bracket 36, this bracket 51 has a plurality of side-by-side openings 57 in a vertically disposed front wall 58 to align with the openings 30 in the base 11 to thus provide for continued ventilation of the telephone apparatus within the telephone base.

The intermediate portion 53 of the bracket 51 has a depending curved portion 59 which abuts the rear inclined wall 35 of the base 11. This depending portion assumes the load of the handset carrying auxiliary bracket 51. It should be understood that the spring lock means holds the bracket fixed to the base and the depending portion 59 directly receives the load imparted thereto by the weight of a telephone handset on the cradle 52. The cradle 52 is constructed the same as the cradle 37 with a transverse bed 60 and upstanding corner posts 61.

The operation of the auxiliary brackets of this invention is obvious from the description of the two devices. The brackets are placed and locked within the recess in the rear of the telephone base whereafter they are immediately usable as auxiliary cradles for the receiver when it is desired to hold a "call" and it is not convenient to hang onto the handset.

Numerous details of construction may be varied throughout a wide range without departing from the principles disclosed herein and I do not propose limiting the patent granted hereon otherwise than as necessitated by the appended claims.

What is claimed is:

1. An auxiliary bracket for telephones of the type having a regular telephone base with a recess in the back thereof and the recess having a substantially flat bottom and a top with a downwardly depending lip, comprising a cradle portion, a recess engaging portion, said recess engaging portion including laterally spaced apart downwardly extending arms flanking grooves on the underside thereof, and means on said recess engaging portion for removably locking the recess engaging portion within the recess.

2. A device as set forth in claim 1 in which the grooves have bottoms inclined upwardly from the end thereof toward the cradle portion to the end of the recess engaging portion, and an upwardly projecting lip means on the top of said recess engaging portion for locking interconnection with the downwardly depending lip of the recess top.

References Cited in the file of this patent

UNITED STATES PATENTS

| | | |
|---|---|---|
| D. 149,455 | Stofer | Apr. 27, 1948 |
| 2,320,838 | Watson | June 1, 1943 |
| 2,614,177 | Orms | Oct. 14, 1952 |